(12) United States Patent
Testardi et al.

(10) Patent No.: US 11,301,489 B2
(45) Date of Patent: Apr. 12, 2022

(54) SYNCHRONIZING ONLINE AND OFFLINE TRANSFER OF DATA TO CLOUD STORAGE SYSTEM

(71) Applicant: Microsoft Technology Licensing, LLC, Redmond, WA (US)

(72) Inventors: Richard Paul Testardi, Boulder, CO (US); Andrea D'Amato, Kirkland, WA (US); Devidas Joshi, San Jose, CA (US); Mohit Kumar Garg, Sunnyvale, CA (US); Sebastien Charles, Morgan Hill, CA (US); Gautam Gopinadhan, San Jose, CA (US); Stephen Wade Wolfe, Fulshear, TX (US); John Renaud, Magnolia, TX (US); Ernie Pistor, Brookline, NH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 16/533,586

(22) Filed: Aug. 6, 2019

(65) Prior Publication Data
US 2021/0042320 A1 Feb. 11, 2021

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC .... G06F 16/27; G06F 16/2365; G06F 3/0619; G06F 3/0659; G06F 3/067; H04L 67/1097

USPC ........................................................ 707/617
See application file for complete search history.

(56) References Cited

U.S. PATENT DOCUMENTS

| | | | |
|---|---|---|---|
| 6,446,175 B1 | 9/2002 | West et al. | |
| 6,644,556 B2 | 11/2003 | Adelmann | |
| 6,850,959 B1 | 2/2005 | Golds | |
| 7,900,061 B2 | 3/2011 | Teicher et al. | |
| 8,090,690 B2 * | 1/2012 | Zamkoff | G06F 11/1464 |
| | | | 707/640 |
| 8,108,636 B2 | 1/2012 | Gordon-Carroll et al. | |
| 8,788,768 B2 | 7/2014 | Clayton et al. | |
| 9,396,245 B2 * | 7/2016 | Mackenzie | G06F 16/275 |
| 9,934,389 B2 | 4/2018 | Paterra et al. | |

(Continued)

OTHER PUBLICATIONS

"International Search Report and Written Opinion Issued in PCT Application No. PCT/US20/036880", dated Sep. 23, 2020, 12 Pages.

(Continued)

*Primary Examiner* — Michael Pham
(74) *Attorney, Agent, or Firm* — Holzer Patel Drennan

(57) ABSTRACT

Transportable storage devices are communicatively coupled behind one or more dedicated "edge" data servers to take advantage of the benefits of the data servers and transportable storage devices while limiting their disadvantages. Each edge data server ingests data from one or more client devices and copies the data to one or more of the transportable storage devices for eventual transport to a cloud data center for upload to a cloud storage system. Multiple versions of a segment of data (e.g., of a file or a blob) are maintained at various points in the disclosed system and the disclosed technology ensures that the most recent version is the version ultimately stored on the cloud storage system.

22 Claims, 10 Drawing Sheets

(56) References Cited

U.S. PATENT DOCUMENTS

| | | |
|---|---|---|
| 10,019,460 B2* | 7/2018 | Benton .................. H04L 67/02 |
| 10,514,988 B2 | 12/2019 | Nagarkar et al. |
| 2012/0330894 A1 | 12/2012 | Slik |
| 2014/0188798 A1* | 7/2014 | Mackenzie ........... G06F 16/182 707/625 |
| 2015/0186668 A1* | 7/2015 | Whaley ................ G06F 16/178 713/156 |
| 2015/0278243 A1 | 10/2015 | Vincent et al. |
| 2015/0350316 A1 | 12/2015 | Calder et al. |
| 2016/0179915 A1 | 6/2016 | Grebnov et al. |
| 2017/0075921 A1 | 3/2017 | Benton et al. |
| 2017/0262350 A1 | 9/2017 | Dornemann |
| 2019/0205050 A1* | 7/2019 | Koorapati ............ G06F 16/184 |
| 2021/0042273 A1 | 2/2021 | Testardi et al. |

OTHER PUBLICATIONS

"International Search Report and Written Opinion Issued in PCT Application No. PCT/US20/036889", dated Sep. 23, 2020, 11 Pages.

"AWS Snowball Edge", Retrieved from: https://web.archive.org/web/20181101195835/https:/aws.amazon.com/snowball-edge/, Nov. 1, 2018, 19 Pages.

"Back up data into Azure with Azure Data Box", Retrieved from: https://azure.microsoft.com/mediahandler/files/Yesourcefiles/data-box-use-case-backup/Data%20Box%20Use%20Case-BackUp.pdf, Retrieved Date: Apr. 4, 2019, 3 Pages.

"Non Final Office Action Issued in U.S. Appl. No. 16/533,602", dated Jan. 6, 2021, 8 Pages.

* cited by examiner

SYNCHRONIZING ONLINE AND OFFLINE TRANSFER OF DATA TO CLOUD STORAGE SYSTEM

CROSS-REFERENCE TO RELATED APPLICATIONS

This application is related to U.S. application Ser. No. 15/533,602, entitled "Namespace Data Object Name Persistence After Decoupling of Transportable Storage Device From Data Server" and filed concurrently herewith, which is specifically incorporated by reference for all that it discloses and teaches.

BACKGROUND

Cloud storage is a model of computer data storage in which the digital data is stored in logical pools. The physical storage spans multiple servers (sometimes in multiple locations), and the physical environment is typically owned and managed by a hosting company. Existing manners of accessing cloud storage space include use of online dedicated data servers and offline storage devices (e.g., hard disk drives, solid-state drives, magnetic tape storage) that are physically transported from a customer site to a data center for upload into the cloud storage space.

SUMMARY

In at least one implementation, the disclosed technology provides a method for use with a cloud storage system. The disclosed method includes receiving, at a cloud upload module from a storage device, an object that includes data and metadata, where the metadata including an object ID and an ingest timestamp corresponding to a time that the data was ingested into the storage device. The method also includes determining whether the object ID exists in an object database of objects stored in the cloud storage system. The method also includes determining a conflict status regarding uploading of the received object into the cloud storage system based on the ingest timestamp of the received object, responsive to the object ID being determined to exist in the object database.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
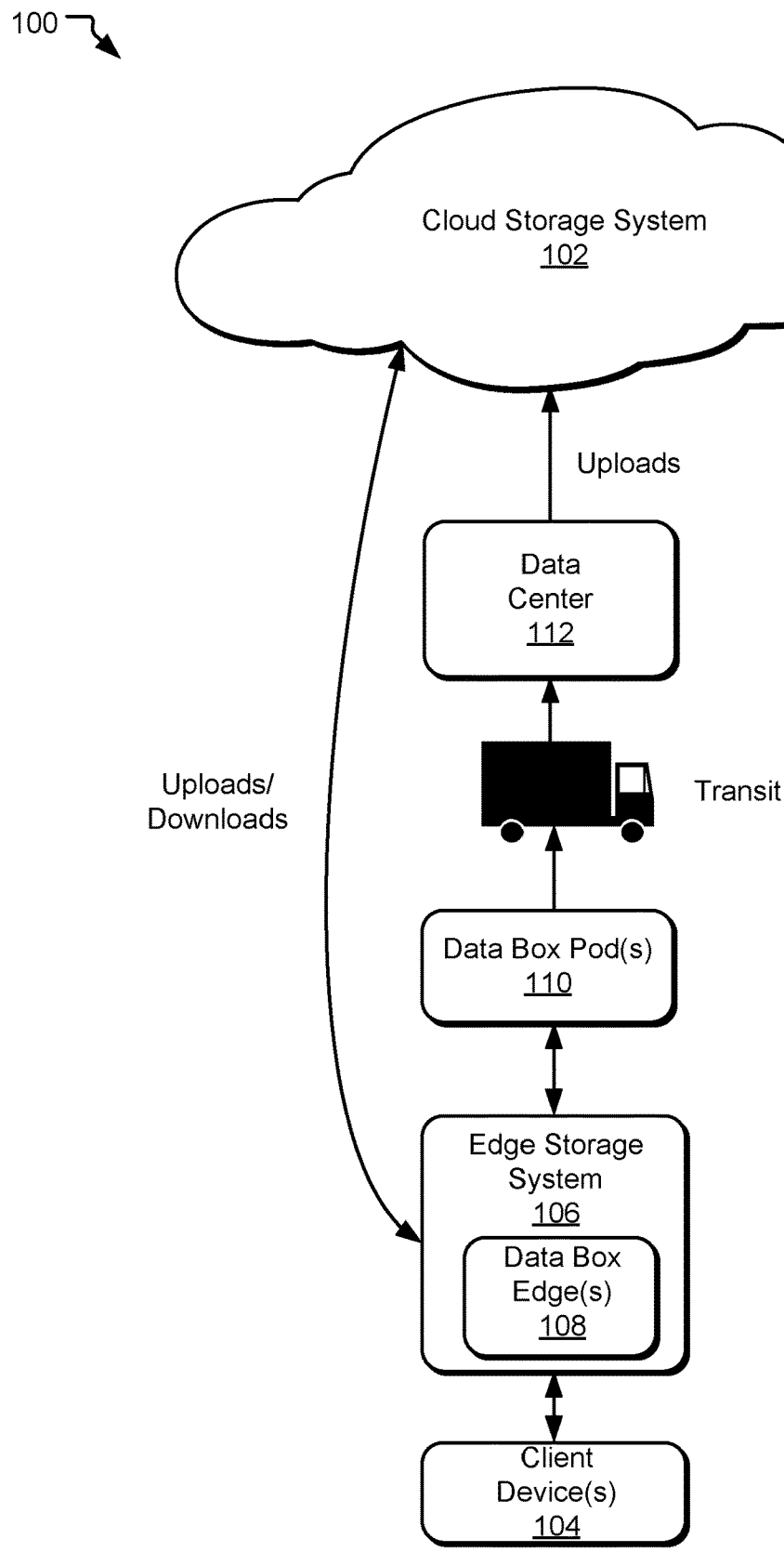
FIG. 1 illustrates an example system for managing online and offline transfer of data between a cloud storage system and one or more remote storage systems.

In cloud storage systems, data (e.g., data objects, such as files and/or blobs) is typically uploaded to cloud storage systems by way of online dedicated data servers and/or offline storage devices (e.g., hard disk drives, solid-state drives) that are physically transported from a customer site to a data center for upload into the cloud storage system. While dedicated data servers typically have relatively low latency when transferring data to a cloud storage system, the quantity of data that such data servers can transfer is often limited (i.e., they have relatively low bandwidth). Furthermore, increased upload latency can often result when customers are continuously generating data but have little to no network connectivity to transfer this data over the wire. In relation to transportable storage devices, they enjoy relatively high bandwidth, as TBs of data can be stored onto such device in short periods of time. However, use of transportable storage devices also results in increased latency (e.g., days, weeks) as such devices typically need to be physically shipped (offline) on a truck or the like from a customer data center to a cloud data center for upload to the cloud storage system.

The disclosed technology makes use of one or more transportable storage devices (each referred to herein as "data boxes," "data box pods," or "pods") that are communicatively coupled (e.g., wired, wirelessly) behind one or more dedicated data servers (each referred to herein as a "data box edge," "edge data server," or "edge" and collectively an "edge storage system") to take advantage of the benefits of the data servers and transportable storage devices while limiting their disadvantages. A data box edge stores data (e.g., from one or more client devices) and copies the data to one or more of the data boxes to which it is communicatively coupled. The data box edge may maintain the data thereon (for access by client devices) until and if storage on the edge becomes limited, at which time the edge may delete the data therefrom and thereafter serve requests for the data from its one or more data boxes (e.g., where the data boxes may effectively serve as a cloud storage space for the edge).

In some cases, an edge may store additional copies of the data on other of the pods to which it is communicatively coupled. The edge also maintains a namespace including a database of object identifiers (e.g., data object names) that link to the copies of the data on the edge and/or on the pod(s). In any case, an edge indicates when one of its pods is filled up and thus ready for offline shipment to the cloud. Upon communicative decoupling of a pod from its edge and during transport to a data center for upload to the cloud storage system, the object identifier for the data stored on the pod may remain in the namespace of the edge. Accordingly, upon the edge receiving a request for the object identifier of the data before the pod has reached the data center, the edge may return a "data temporarily unavailable" message to the requester. In the case where the data is stored on another pod to which the edge is communicatively coupled, the edge may retrieve the data from such pod and return the same to the requester. Upon the edge receiving a request for the object identifier of the data after receipt of the pod at the data center and upload of the data to the cloud storage system, the edge may download the data from the cloud storage system and serve the data to the requesting device. Once the data in transit has been ingested into the cloud storage system, the edge drops (deletes) the one or more additional copies of the data and may continue to fill data continuously to the pods on-premise.

Upon ingestion of data on one or more edges, the data can be uploaded from the one or more edges on a low-latency, low bandwidth LAN to the cloud storage system (when the edge(s) is/are online) and/or copied to one or more of its pods and transferred to the cloud by way of physically transporting the pod(s) to a cloud data center and uploading the data to the cloud (e.g., as a high-latency, high-bandwidth WAN to the cloud). When different versions of the same data are delivered/uploaded to the cloud storage system from edges and/or pods in various orders, the most recent version of the data will ultimately be stored in the cloud for subsequent downloads to the edges while older versions may be deleted or archived.

For example, a first version of data may be ingested into an edge at a first time and copied onto a first of its pods, which may be subsequently communicatively decoupled from its edge, transported to a data center, and uploaded to the cloud storage center. The namespaces of all edges at a customer's site may then be refreshed to include the object identifier of the first data version. At a (later) second time, a first user may access the object identifier in the namespace of a first edge to download a copy of the data from the cloud storage center and create a second version of the data, which may be ingested into the first edge at a first ingest time and copied to one of its pods. At a still later third time, a second user may access the object identifier in the namespace of a second edge to download a copy of the data from the cloud storage center and create a third version of the data which may be ingested into the first edge at a second ingest time and copied to one of its pods.

Assuming no further updates to the data occur, the third version of the data will be the version ultimately stored to the cloud storage system (regardless of the order in which the two pods arrive at the cloud data center as the second time is more recent than the first time). If the pod storing the second version arrives first, the second version may be initially uploaded, and then the third version may be uploaded and overwrite the second version when the pod storing the third version arrives. For example, a cloud upload module or engine may analyze ingest time metadata associated with the second and third versions to determine that the third version is more recent. Alternatively, if the pod storing the third version arrives first, the third (most recent) version may be uploaded. When the second version arrives at the cloud data center, the cloud upload module may inhibit uploading of the second version as its ingest metadata is older than that of the third version.

As another example, the cloud storage system may already store a version of a data object along with metadata including a first ingest time (i.e., the time at which the data version was ingested to an edge). Upon subsequent receipt at the cloud upload module of another version of the object having metadata including a second ingest time older than the first ingest time, the cloud upload module may disallow uploading of the other version of the object.

Data can be concurrently uploaded from the edge and transported in the pod for upload to take advantage of low latency connections of the edge when available and high bandwidth of the pod. By the time the pod arrives at the cloud data center for upload to the cloud storage system, the cloud upload module can determine which portions of the data were already uploaded from the edge and then only initiate upload from the pod those portions not yet uploaded. In various implementations, the edge can upload to the cloud using an edge upload module, and the pod can upload to the cloud using a cloud upload module. The ordering of such uploads may vary, which can create out-of-order conflicts in the uploaded data if not handled.

Different edges may contain different versions of the same cloud data, and in the end, the most recent cloud data will end up in the cloud storage system. While connected to the Internet, an edge can download the most recent cloud data from all other edges. Furthermore, changes made by users to data versions in the cloud are eventually propagated back to the edge(s) and vice versa.

FIG. 1 illustrates an example system 100 for managing online and offline transfer of data between a cloud storage system 102 and one or more remote storage systems. As shown, a user may create or otherwise obtain data on a client device 104 (e.g., laptop, tablet, internet of things (IoT) device, and/or other computing device) and ingest the same from the client device 104 into an edge storage system 106 of a customer site made up of one or more data box edges 108. Thereafter, each data box edge 108 automatically copies or otherwise backs up the ingested data (e.g., full files/blobs) into one or more data box pods 110 to which each of the data box edges 108 is communicatively coupled.

Each data box edge 108 may be a physical device (e.g., rack-mounted server or the like) residing on a customer's premises and data objects may be written to the data box edge 108, such as via Network File System (NFS), Server Message Block (SMB) and Azure storage protocols. In some arrangements, the data box edge 108 may preprocess data obtained from one or more client devices 104 such as by aggregating data, modifying data (e.g., to remove Personally Identifiable Information (PII)), and the like. A local web user interface of the data box edge 108 allows users to run diagnostics, shut down and restart the data box edge 108, and the like. Furthermore, a resource (e.g., application) in a portal used to access the cloud storage system 102 allows users to manage the data box edge 108 from a web interface accessible from various geographical locations.

Before either of the data box edge(s) 108 or data box pod(s) 110 is substantially filled, requests for the data may be served from the data box edge(s) 108 and/or the data box pod(s) 110. When the data box edge 108 is online, it may upload the data to the cloud storage system 102 in any appropriate manner. Additionally, or alternatively, the data box pod(s) 110 may be communicatively decoupled from the edge storage system 106 and then physically transported (e.g., offline via a truck or the like) to a data center 112 for upload of the data to the cloud storage system 102. For example, upon a data box pod 110 becoming at least substantially filled, the edge storage system 106 may detect the same and generate a signal that the data box pod 110 needs to be shipped to the data center 112 for upload of the data.

Regardless of the order in which the data arrives at the cloud storage system 102 or data center 112, the correct (e.g., most recent) version of the data is the version that will be stored in the cloud storage system 102. For example, in the event that a new version of data is ingested into a data box edge 108 and uploaded to the cloud storage system 102 while an older version of the data stored on a data box pod 110 is being shipped to the data center 112, the disclosed technology will inhibit the older version, once the data box pod 110 arrives at the data center 112, from being uploaded to the cloud storage system 102 so as to not overwrite the newer version (e.g., by way of detecting that the newer version is linked to a more recent edge ingest time than is the older version). Each data box edge 108 can also download data from the cloud storage system 102.

Figure 2:
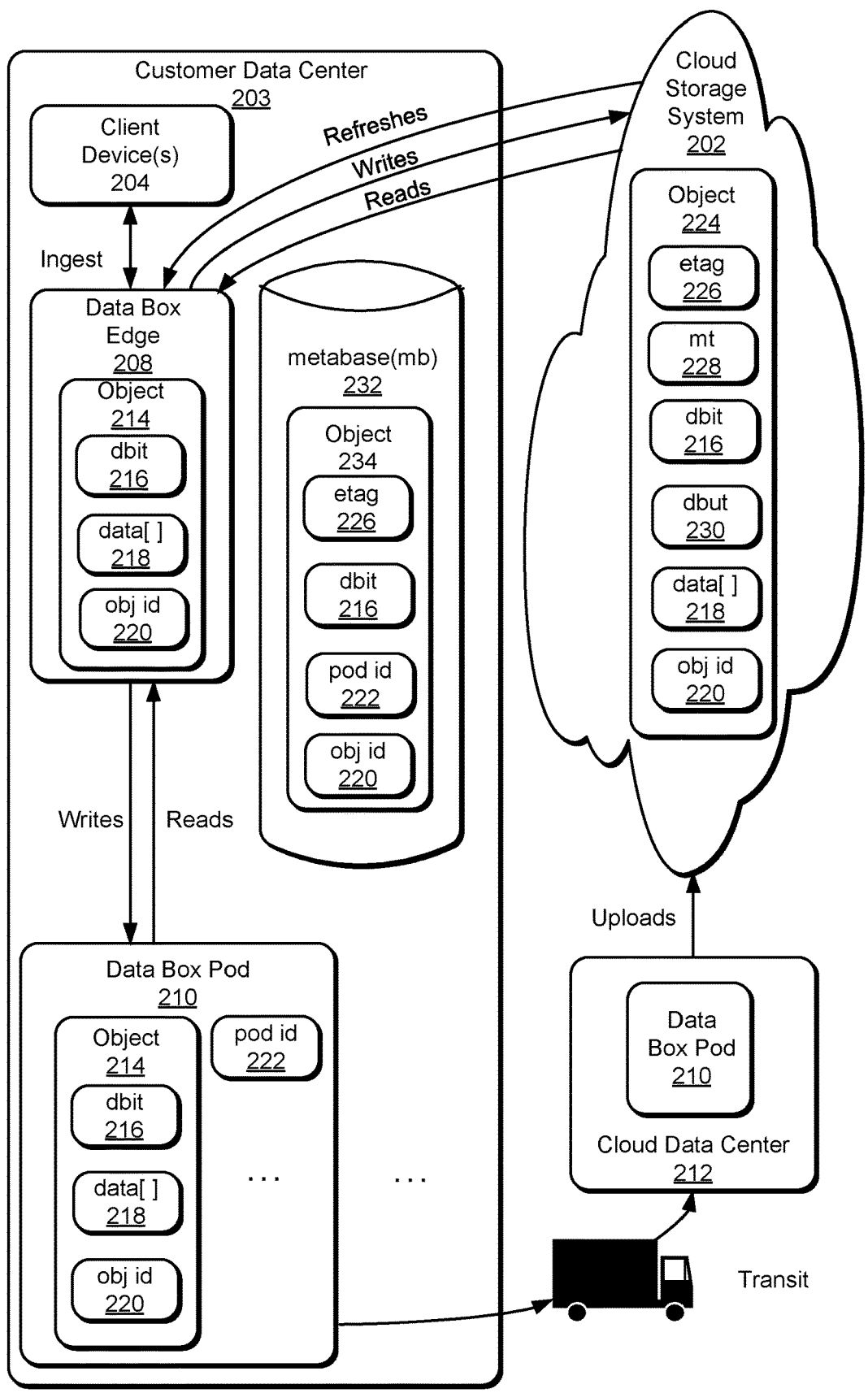
FIG. 2 illustrates another example system for managing online and offline transfer of data between a cloud storage system and one or more remote storage systems.

FIG. 2 illustrates another example system for managing online and offline transfer of data between a cloud storage system 202 and one or more remote storage systems in a manner ensuring that in the case of multiple different versions of data being stored at different times in different portions of the system, the most recent (correct) version of the data will be the version ultimately stored on the cloud storage system 202 and later downloaded for storage to one or more data box edges 208 in the system while older versions will be archived and/or deleted. A customer data center 203 broadly includes at least one client device 204 (e.g., laptop, desktop, tablet, and/or another computing device), and at least one data box edge 208 (e.g., data server, only one shown in FIG. 2) that is configured to ingest copies of data created on or otherwise obtained by the client device 204. The customer data center 203 may also employ one or more one data box pods 210 (e.g., transportable storage devices, only one shown in FIG. 2) communicatively coupled (e.g., wired, wirelessly) to each data box edge 208 to which the data box edge 208 is configured to automatically copy data ingested from client device 204. It should be understood that the edge can operate without any pods connected to it, any pods in transport, or any pods uploading to the cloud storage system 202.

Data from each data box edge 208 may be selectively written (uploaded) to the cloud storage system 202, data from the cloud storage system 202 may be read by each data box edge 208, and each data box edge 208 may refresh data already stored on the data box edge 208 with updated versions of the data stored on the cloud storage system 202. Furthermore, each data box pod 210 may be communicatively decoupled (e.g., detached) from its corresponding data box edge 208 and transported to a cloud data center 212 for selective upload of the data stored on the data box pod 210 to the cloud storage system. In one arrangement, an indication that the data box pod 210 is unable to accept further storage of data thereon may be generated by the data box pod 210 and passed to the data box edge 208 whereby the communicative decoupling of the data box pod 210 from the data box edge 208 occurs responsive to the received indication.

As discussed herein, it is important that in the case where multiple versions of the same data are stored at different times in different portions of the system, the most recent (correct) version of the data will be the version ultimately stored on the cloud storage system 202. In this regard, the disclosed technology generates and makes use of metadata to allow for the intelligent assessment of multiple versions of data and identification of the correct version of the data to be stored on a cloud storage system. The technology encapsulates the metadata (and sometimes also the actual customer data) into "objects" (e.g., data structures) that are stored in various portions of the system and used to reconcile conflicts among multiple data versions as will be discussed.

Upon ingestion of customer data 218 (e.g., one or more data objects) from client device 204 into data box edge 208, the data box edge 208 generates or obtains metadata including a last data box edge ingest time ("dbit") 216 and an object identifier ("obj id") 220 and then encapsulates the data 218 and metadata into a data object 214. The dbit 216 represents a time that the data 218 was ingested or copied into the data box edge 208 (e.g., as identified by a timestamp of the client device 204 or the data box edge 208) while the object identifier 220 is used to uniquely identify the data 218 from other pieces of data (e.g., other data objects). However, in the case where two different pieces of data 218 represent different versions of the same underlying data object, for example, the two data objects 214 for such two pieces of data 218 would share the same object identifier 220. While FIG. 2 only illustrates a single data object 214 in the data box edge 208, it is to be understood that each data box edge 208 may store numerous data objects 214. For example, two or more data objects in different locations (e.g., the edge, one or more pods, the cloud) and/or different states (e.g., different ingest times) may share the same object identifiers 220 but have different dbits 216; alternatively, two or more data objects may have different object identifiers 220, data 218, and dbits 216; and the like.

As noted herein, when moving data from the edge via data box pods, the data box edge 208 copies data objects 214 to one or more data box pod 210s that are communicatively coupled to the data box edge 208. Thus, while the same reference numerals are used to describe the data object 214 in the data box edge 208 and the data object 214 in the data box pod 210, it is to be understood that the data objects are logically different (different storage locations, different states), even if they have the same information/data. The data objects 214 may be maintained in the data box edge 208 and the data box pod 210 until such time that the data box edge 208 needs to make more room for further data ingestion from the client device 204, at which time the data box edge 208 may delete the actual data storage of the data object 214 from the data box edge 208, leaving a placeholder or "data stub" in the namespace of the data box edge 208 and treating the data object 214 in the data box pod 210 as a cloud-based version of the data (that it can "download" from the data box pod 210 as needed) while the data box pod 210 is communicatively coupled to the data box edge 208 (e.g., before shipment to the cloud data center 212). In this manner, data storage associated with the data object 214 is removed from the data box edge 208, but the object identifier of the data object 214 remains in the namespace of the data box edge 208. The data box edge 208 or data box pod 210 also assigns a pod identifier ("pod id") 222 to the data box pod 210 to uniquely identify the data box pod 210 among other data box pods 210 in the customer data center 203.

To read a data object 214 from a data box pod 210 at the customer data center 203, the data box edge 208 may determine whether the pod id of an incoming request matches a pod id 222 in an object 234 of the metabase 232, whether at least one data object 214 exists in the data box pod 210, and whether the dbit 216 of the data box pod 210 matches the dbit 216 of the metabase 232; if so, the data 218 of the data box pod 210 is returned. Otherwise, a "not found" message or the like is returned. To write a data object 214 to a data box pod 210 at the customer data center 203, the data box edge 208 may specifies the pod id 222 of the data box pod 210 in a write request, writes the data object 214 to the corresponding data box pod 210 that matches a pod id 222, and updates the ingest time (e.g., dbit 216) of the data object written to the data box pod 210.

Upon communicative decoupling of the data box pod 210 from its data box edge 208 (e.g., upon detection that the data box pod 210 is full or at another appropriate time) and shipment to the cloud data center 212, the data 218 and metadata on the data box pod 210 may be uploaded to the cloud storage system 202 in any appropriate manner (e.g., LAN, WAN, etc.). As part of the upload of the data 218 and metadata to the cloud storage system 202, the cloud storage system 202 generates or obtains additional metadata and then encapsulates the data 218, metadata from the data box pod 210, and additional metadata into a data object 224 and stores the same in any appropriate region or area of the cloud storage system 202. While only a single data object 224 is illustrated in FIG. 2, the cloud storage system 202 may actually store numerous objects corresponding to numerous different object identifiers 220 and different data 218.

As shown, the additional metadata includes an entity tag ("etag") 226, a last data box upload time ("dbut") 230, and optionally a last cloud modify time ("mt") 228. The etag 226 is generated by the cloud storage system 202 each time a data object 224 is created or updated in the cloud storage system 202 and allows a last writer of the data 218 in the data object 224 (who alone knows the etag 226) to take a "happy path" to the data object 224 and further update the data object 224 without having to "lease" the data object (determine whether or not data objects 214 from the data box edge 208 or data box pod 210 conflicts) assuming no updates to the data object 224 have occurred on the cloud storage system 202. The dbut 230 represents a time that the data 218 was uploaded from the data box edge 208 to the cloud storage system 202 (e.g., as identified by a timestamp of the data box edge 208 or cloud storage system 202) or from the cloud data center 212 to the cloud storage system 202 (e.g., as identified by a timestamp of the cloud data center 212 or cloud storage system 202). The mt 228 is generated by the cloud storage system 202 each time a data object 224 is updated on the cloud storage system 202 (e.g., whether by a third party editing the object directly on the cloud storage system 202, via upload of updated data from the cloud data center 212, or upload of updated data from the data box edge 208).

Each data box edge 208 maintains and/or has access to a metabase (mb) 232 that is broadly configured to store metadata for objects maintained in the customer data center 203 and cloud storage system 202 for use in identifying object conflicts as discussed in more detail below. The mb 232 may be maintained within the data box edge 210 and/or be maintained in a separate device and accessible to the data box edge 208 in any appropriate manner. For each respective object identifier 220, the data box edge 208 may encapsulate within an object 234 the current etag 226 received from the cloud storage system 202 (e.g., which may be pushed down to the customer data center 203 upon creation or update of a corresponding data object 224), the dbit 216, the pod identifier 222, and the object identifier 220. While each data object 224 in the cloud storage system 202 is illustrated as including both the customer data 218 and the various pieces of metadata, one implementation envisions that the cloud storage system 202 may also include a metabase of the metadata while the customer data 218 may be stored separately from the metabase. In this implementation, the metadata would be linked to the customer data 218 by way of the object identifier 220 (e.g., where the same object identifier 220 would be stored with the metadata in the metabase and separately with the customer data 218).

Figure 3:
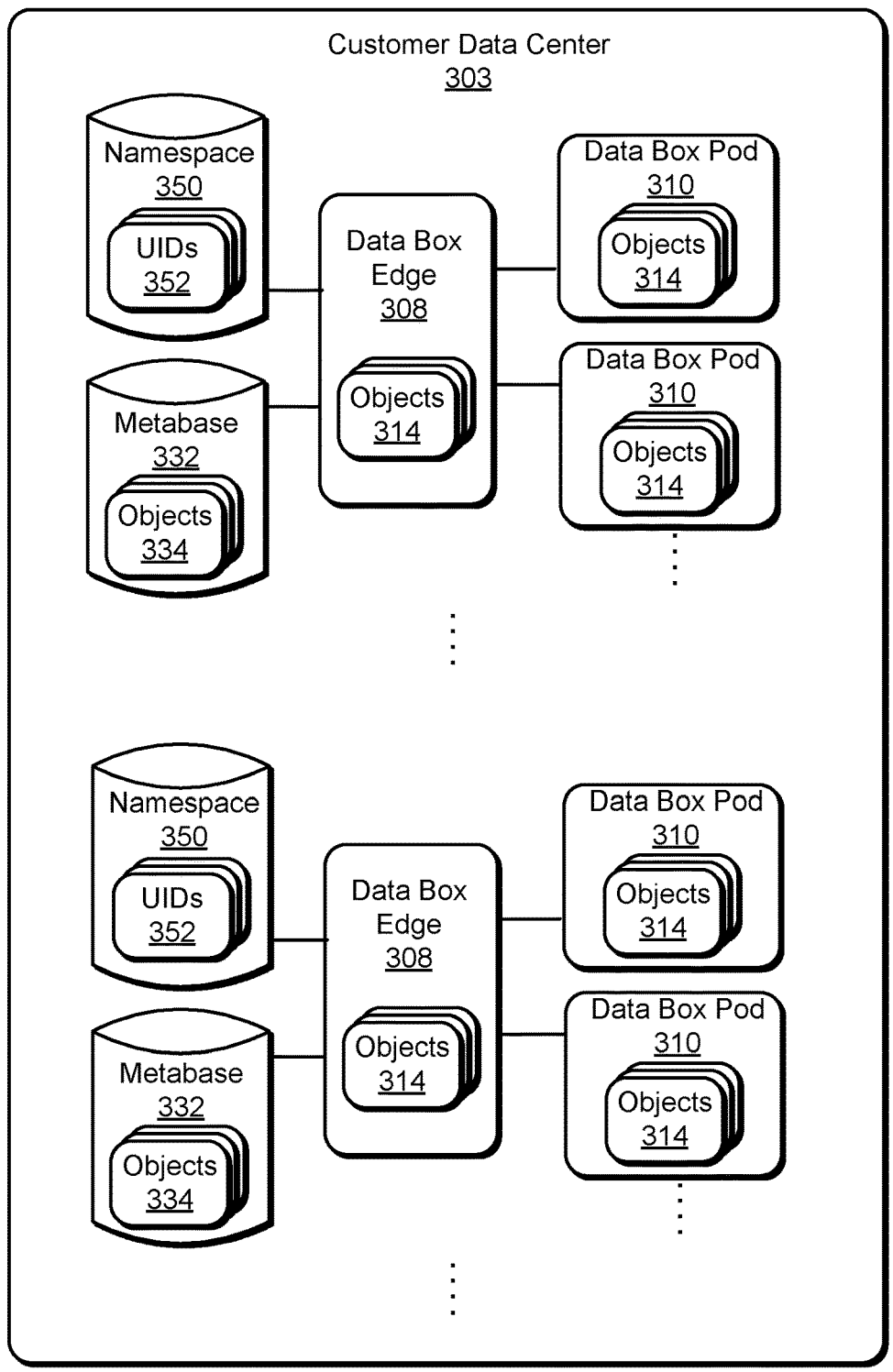
FIG. 3 illustrates an example customer data center for use in conducting online and offline data transfer to a cloud storage system

Before discussing how the metadata is utilized by the disclosed technology to identify conflicts among various data objects, reference is made to FIG. 3 which illustrates how a customer data center 303 may include a plurality of data box edges 308 storing objects 314, where each data box edge 308 includes one or more data box pods 310 communicatively coupled thereto, and where each data box edge includes a metabase 332 of objects 334. Furthermore, each data box edge 308 maintains a namespace 350 (e.g., directory) of object identifiers (UIDs) 352 (e.g., data object paths) corresponding to customer data in the data box edge 308, its data box pods 310, other data box edges 308, and the cloud storage system. Upon ingestion of customer data into a data box edge 308 and creation of corresponding objects 314, the data box edge 308 creates or obtains a UID 352 for the data in the namespace 350 that allows users to see that the data exists (e.g., via a user interface in communication with the namespace 350).

In various implementations, the object identifiers at the edge, the pod, and the cloud are identical. In other implementations, the object identifiers at the edge, the pod, and the cloud may be mapped transformations of each other or otherwise different by providing enough information to allow correspondence and/or association of such object identifiers to be determined by the edge, the pod, and the cloud.

As discussed herein, situations exist in which particular data is only available on a single data box pod 310 (e.g., the data has been removed from its corresponding data box edge 308) which is subsequently communicatively decoupled from its data box edge 308 and has not yet reached the cloud data center for upload to the cloud storage system. In this case, the UID 352 for the data on the data box pod remains in the namespace 350 of the data box edge 308 so that client devices can see that the corresponding data exists (in contrast to other systems where data on a transportable device in transit is essentially invisible to client devices until the transportable device has been uploaded to a cloud storage system). However, manipulation of the UID 352 in the namespace 350 before uploading of the data to the cloud storage system induces the data box edge 308 to return a "data temporarily unavailable" message or the like to the user. In this regard, the UID 352 serves as a data stub while the data box pod 310 is in transit. Once the data has been uploaded to the cloud storage system, manipulation of the corresponding UID 352 in the namespace 350 induces the data box edge 308 to download the corresponding data from the cloud storage system and serve the data to the client device.

In the situation where a data box edge 308 has uploaded one or more particular objects 314 to the cloud storage system, the data box edge 308 may "ghost" (e.g., remove, stub) the one or more objects from the data box edge 308 while maintaining their corresponding UIDs 352 in the namespace 350. A subsequent access of such corresponding UIDs 352 induces the data box edge 308 to download the corresponding data from the cloud storage system and serve the data to the client device. The various data box edges 308 are also configured to share updates to their respective namespaces 350 with the other data boxes edges 308 such that the namespaces 350 of all data box edges 308 are identical or nearly identical in substantially real time. In relation to access of a particular UID 352 in the namespace 350 of a data box edge 308 where the corresponding data is stored on the data box edge 308, the data box edge 308 returns the data to the client device. In relation to access of a particular UID 352 in the namespace 350 of a data box edge 308 where the corresponding data is only stored in the cloud storage system, the data box edge 308 downloads and returns the corresponding data to the client device. In relation to access of a particular UID 352 in the namespace 350 of a data box edge 308 where the corresponding data is only stored on another data box edge 308 (or only on the other data box edge's 308 corresponding data box pod 310), the data box edge 308 may request and receive the corresponding data from the other data box edge 308 and then serve the data to the client device, in some implementations.

Figure 4:
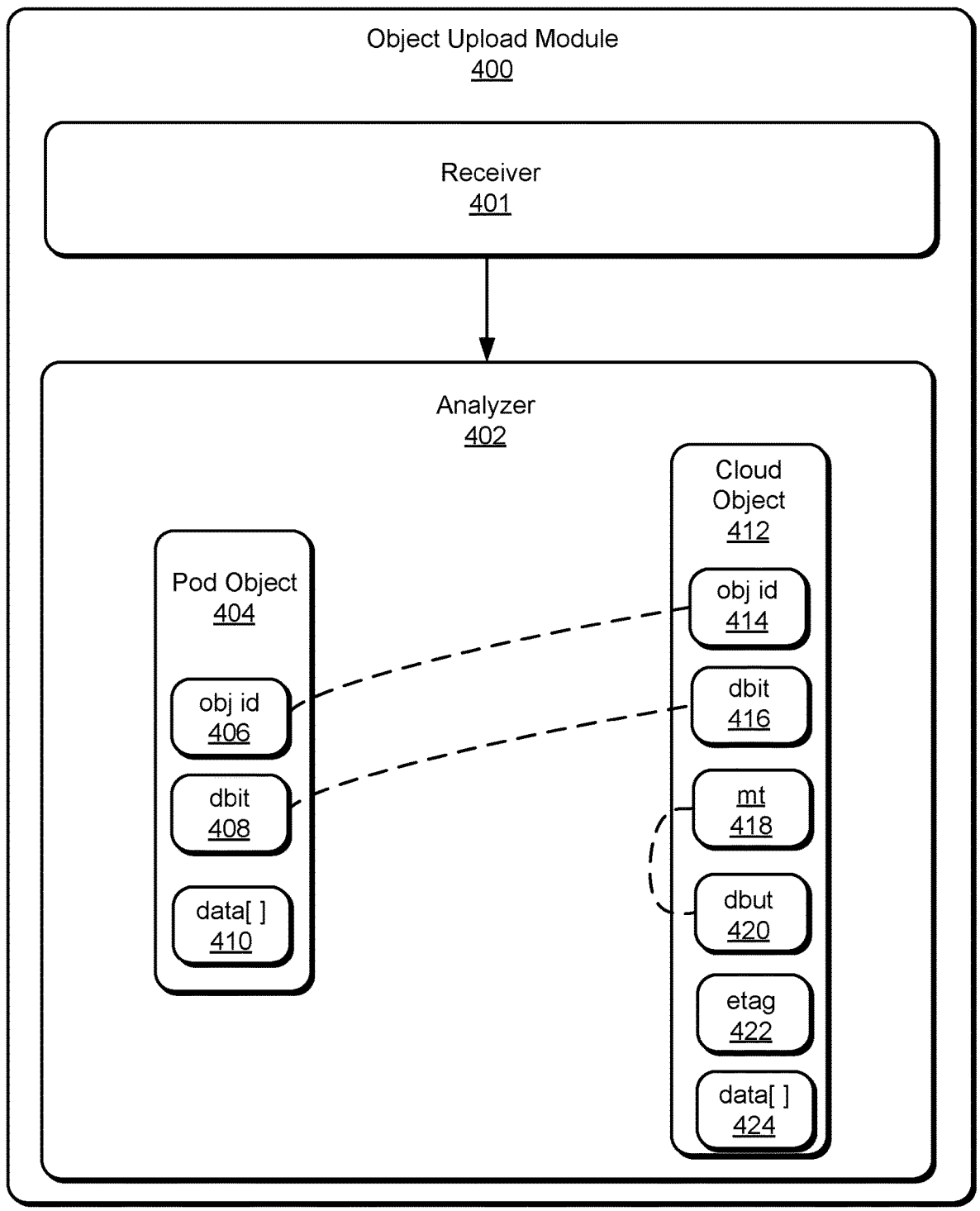
FIG. 4 illustrates an example system for managing uploads of objects to a cloud storage system.

As discussed herein, it is important for the disclosed technology to maintain the most recent version of data (e.g., of a data object) on the cloud storage system despite various versions of the data possibly existing on data box edges, data box pods communicatively coupled to their data box edges or in transit, and the like. With reference now to FIG. 4, an object upload module 400 is illustrated that is configured to determine a conflict status of an object stored in a data box pod. The object upload module 400 may be resident on the cloud data center and/or on the cloud storage system. Broadly, the object upload module 400 includes a receiver 401 that receives a pod object 404 and an object analyzer 402 that evaluates the metadata of the pod object 404 in view of objects stored in the cloud storage system to determine whether data and metadata in the pod object should be uploaded to the cloud storage system.

The analyzer 402 may initially use the object identifier 406 of the pod object 404 as a key into a database of objects in the cloud storage system to determine whether the same object identifier 406 already exists in the cloud storage system. If the analyzer 402 determines that the same object identifier does not already exist in the cloud storage system, the object upload module 400 may then initiate upload of the pod object 404 into the cloud storage system whereby the cloud storage system creates a corresponding cloud object 412. In this case, the object identifier 414 of the cloud object 412 would be the same as the object identifier 406 of the pod object 404, the dbit 416 of the cloud object 412 would be the same as the dbit 408 of the pod object 404, and the data 424 of the cloud object 412 would be the same as the data 410 of the pod object 404.

If the analyzer 402 determines that the object identifier 406 of the pod object 404 already exists in the cloud storage system (i.e., the object identifier 414 of an existing cloud object 412 in the cloud storage system matches the object identifier 406 of the incoming pod object 404), then the analyzer 402 initially compares the respective dbits 408, 416. If the dbit 416 of the existing cloud object 412 is more recent than the dbit 408 of the pod object 404, then the data 424 in the existing cloud object 412 was modified more recently than the data 410 in the incoming pod object 404 (e.g., updated data associated with the same object identifier was ingested into a data box pod after ingestion of the data 410 of the pod object 404 but uploaded to the cloud storage system before arrival of the pod object 404 at the object upload module 400). Accordingly, the object upload module 400 inhibits uploading of the pod object 404 into the cloud storage system.

Even if the dbit 408 of the pod object 404 is more recent than the dbit 416 of the cloud object 412, the analyzer 402 then assesses whether the mt 418 in the cloud object 412 is more recent than the dbut 420 in the cloud object 412; if so, this means that a user has updated the data 424 in the cloud object 412 from or at the cloud storage system rather than via a data box edge or pod. Specifically, if a user has updated the data 424 directly via the cloud storage system, the mt 418 would be updated but the dbut 420 would not. Accordingly, the object upload module 400 inhibits uploading of the pod object 404 into the cloud storage system.

If the analyzer 402 determines that the dbit 408 is more recent that the dbit 416 and the dbut 420 is more recent than the mt 418, then the object upload module 400 allows upload of the pod object 404 into the cloud storage space. In this case, the cloud storage system would replace the dbit 416 with the dbit 408 of the incoming pod object 404 and replace the data 424 with the data 410 in the incoming pod object 404. The cloud storage system would also update the mt 418 and the dbut 420 to the current time and generate a new etag 422. In one implementation, the cloud storage system may subtract a predetermined amount of "slop" time from the current time before setting the updated dbut 420. In any case, subsequent requests for the UID in the namespace of one or more of the data box edges would initiate download of the updated data 424 from the cloud storage system to the requesting data box edge. As part of this process, the downloading data box edge would update the corresponding object in its metabase (e.g., metabase 232 of FIG. 2) to reflect the updated metadata.

Figure 5:
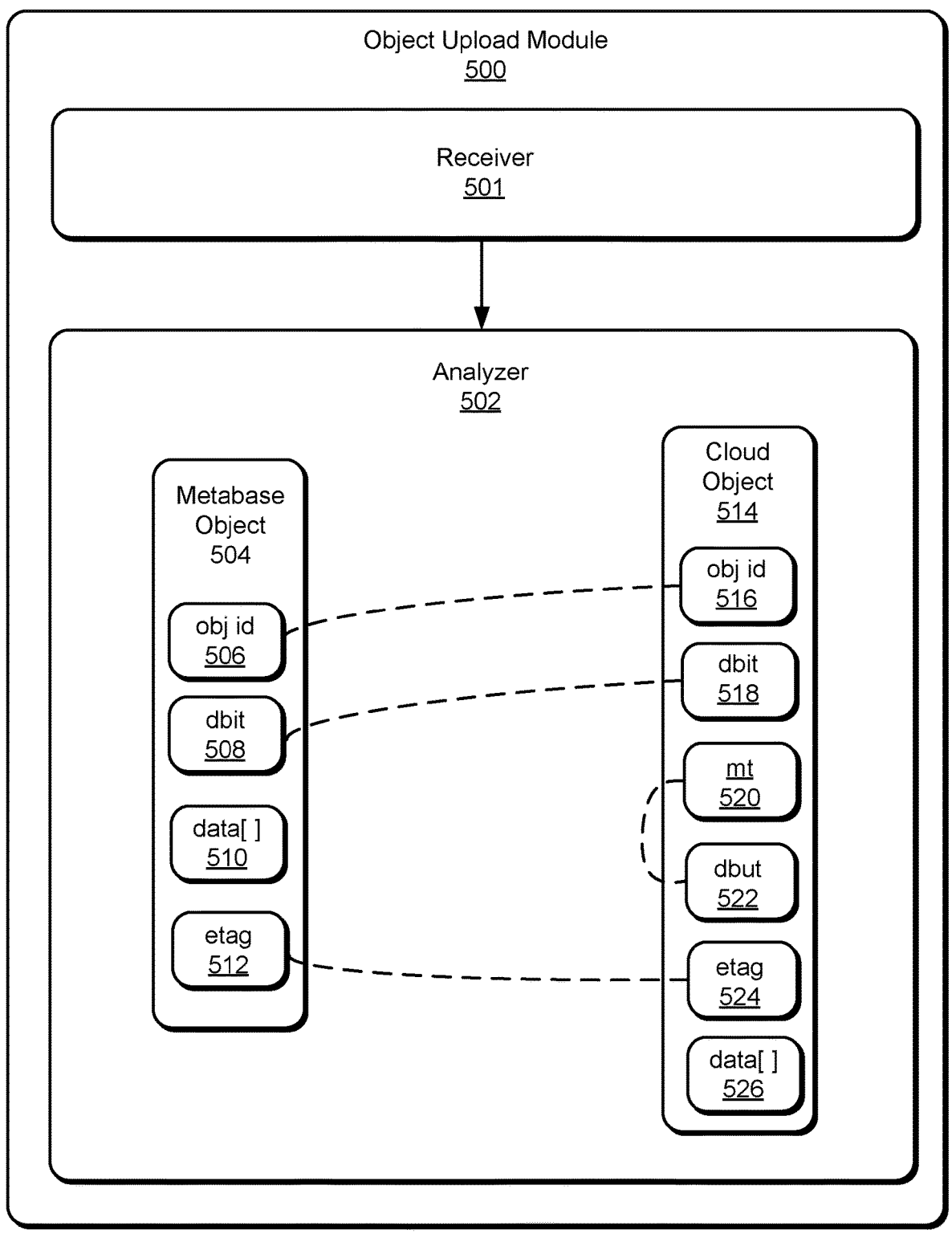
FIG. 5 illustrates another example system for managing uploads of objects to a cloud storage system.

With reference now to FIG. 5, an object upload module 500 is illustrated that is configured to determine a conflict status of an object stored in the edge storage system (e.g., a data box edge) is to be uploaded to the cloud storage system. The object upload module 500 may be resident on the cloud storage system and/or on the edge storage system. Broadly, the object upload module 500 includes a receiver 501 that receives a metabase object 504 and an object analyzer 502 (e.g., a conflict manager) that evaluates the metadata of the metabase object 504 in view of objects stored in the cloud storage system to determine whether data and metadata should be uploaded from the corresponding data box edge to the cloud storage system. While the metabase object 504 is illustrated as including data 510 for purposes of facilitating the below discussion, the data 510 may in some arrangements be stored in an object of the data box edge (e.g., as in FIG. 2) in which case the object upload module 500 would retrieve the data from the data box edge object and facilitate upload of the same to the cloud storage system if the object upload module 500 so decides.

The analyzer 502 may initially use the object identifier 506 of the metabase object 504 as a key into a database of objects in the cloud storage system to determine whether the same object identifier 506 already exists in the cloud storage system. If the analyzer 502 determines that the same object identifier does not already exist in the cloud storage system, the object upload module 500 may then initiate upload of the metabase object 504 into the cloud storage system whereby the cloud storage system creates a corresponding cloud object 514. In this case, the object identifier 516 of the cloud object 514 would be the same as the object identifier 506 of the metabase object 504, the dbit 518 of the cloud object 514 would be the same as the dbit 508 of the metabase object 504, and the data 526 of the cloud object 514 would be the same as the data 510 of the metabase object 504.

If the analyzer 502 determines that the object identifier 506 of the metabase object 504 already exists in the cloud storage system (i.e., the object identifier 515b of an existing cloud object 514 in the cloud storage system matches the object identifier 506 of the incoming metabase object 504), then the analyzer 502 then determines whether the etag 512 of the incoming metabase object 504 matches the etag 524 of the existing cloud object 514. As discussed herein, an etag 524 is generated by the cloud storage system each time the cloud object 514 is updated (e.g., each time the data 526 is updated), and typically only the user associated with the most recent update of the object 514 is aware of the etag 514.

Accordingly, if the analyzer 502 determines that the etag 512 in the incoming metabase object 504 matches the etag 524 in the existing cloud object 514, this means it is the most recent user that is updating its own data, and the object upload module 500 thus initiates upload of the metabase object 504 to the cloud storage system. In other words, the user of the etag 512 matching the etag 524 allows the user to take a "happy path" to the cloud object 514 and thus modify the data 526 free of having to first determine whether any other updates have priority. In this case, the cloud storage system would replace the dbit 518 with the dbit 508 of the incoming metabase object 504 and replace the data 526 with the data 510 in the incoming metabase object 504. The cloud storage system would also update the mt 520 and the dbut 522 to the current time and generate a new etag 524. In this regard, subsequent requests for the UID in the namespace of one or more of the data box edges would initiate download of the updated data 526 from the cloud storage system to the requesting data box edge. As part of this process, the downloading data box edge would update the corresponding object in its metabase (e.g., metabase 232 of FIG. 2) to reflect the updated metadata (e.g., the updated dbit 518, mt 520, dbut 522, etag 524, etc.).

If the analyzer 502 determines that the etag 512 in the incoming metabase object 504 does not match the etag 524 in the existing cloud object 514, then the data 510 in the incoming metabase object 504 was presumably not generated by the user associated with the most recent update of the data 526 in the cloud object 514. Accordingly, the analyzer 502 then compares the respective dbits 508, 518. If the dbit 518 of the existing cloud object 514 is more recent than the dbit 508 of the metabase object 504, then the data 526 in the existing cloud object 514 was modified more recently that the data 510 in the incoming metabase object 504 (e.g., updated data associated with the same object identifier was ingested into a data box edge after ingestion of the data 510 of the metabase object 504 but uploaded to the cloud storage system before arrival of the metabase object 504 at the object upload module 500). Accordingly, the object upload module 500 inhibits uploading of the metabase object 504 into the cloud storage system.

Even if the dbit 508 of the metabase object 504 is more recent than the dbit 518 of the cloud object 514, the analyzer 502 then assesses whether the mt 520 in the cloud object 514 is more recent than the dbut 522 in the cloud object 514; if so, this means that a user has updated the data 526 in the cloud object 514 from or at the cloud storage system rather than via a data box edge or pod. Accordingly, the object upload module 500 inhibits uploading of the metabase object 504 into the cloud storage system. If the analyzer 502 determines that the dbit 508 is more recent that the dbit 518 and the dbut 522 is more recent than the mt 520, then the object upload module 500 allows upload of the metabase object 504 into the cloud storage system. In this case, the cloud storage system would replace the dbit 518 with the dbit 508 of the incoming metabase object 504 and replace the data 526 with the data 510 in the incoming metabase object 504. The cloud storage system would also update the mt 520 and the dbut 522 to the current time and generate a new etag 524. In this regard, subsequent requests for the UID in the namespace of one or more of the data box edges would initiate download of the updated data 526 from the cloud storage system to the requesting data box edge. As part of this process, the downloading data box edge would update the corresponding object in its metabase (e.g., metabase 232 of FIG. 2) to reflect the updated metadata.

It should be understood that an object upload module at a pod or for uploading of pod data to the cloud, such as the object upload module 400 may employ the same or similar uploading operations and accompanying data as an object upload module at an edge, such the object upload module 500. Alternatively, either one of the modules may have different operations and/or data. For example, in one implementation, etags may not be transported with a pod (such as shown in FIG. 4) and, as such, the object upload module 400 may not be capable of comparing etags with the cloud storage system metabase. However, in other implementations, etags may be transported with the pod, and so etag comparison may be available for uploading from a pod to the cloud.

Figure 6:
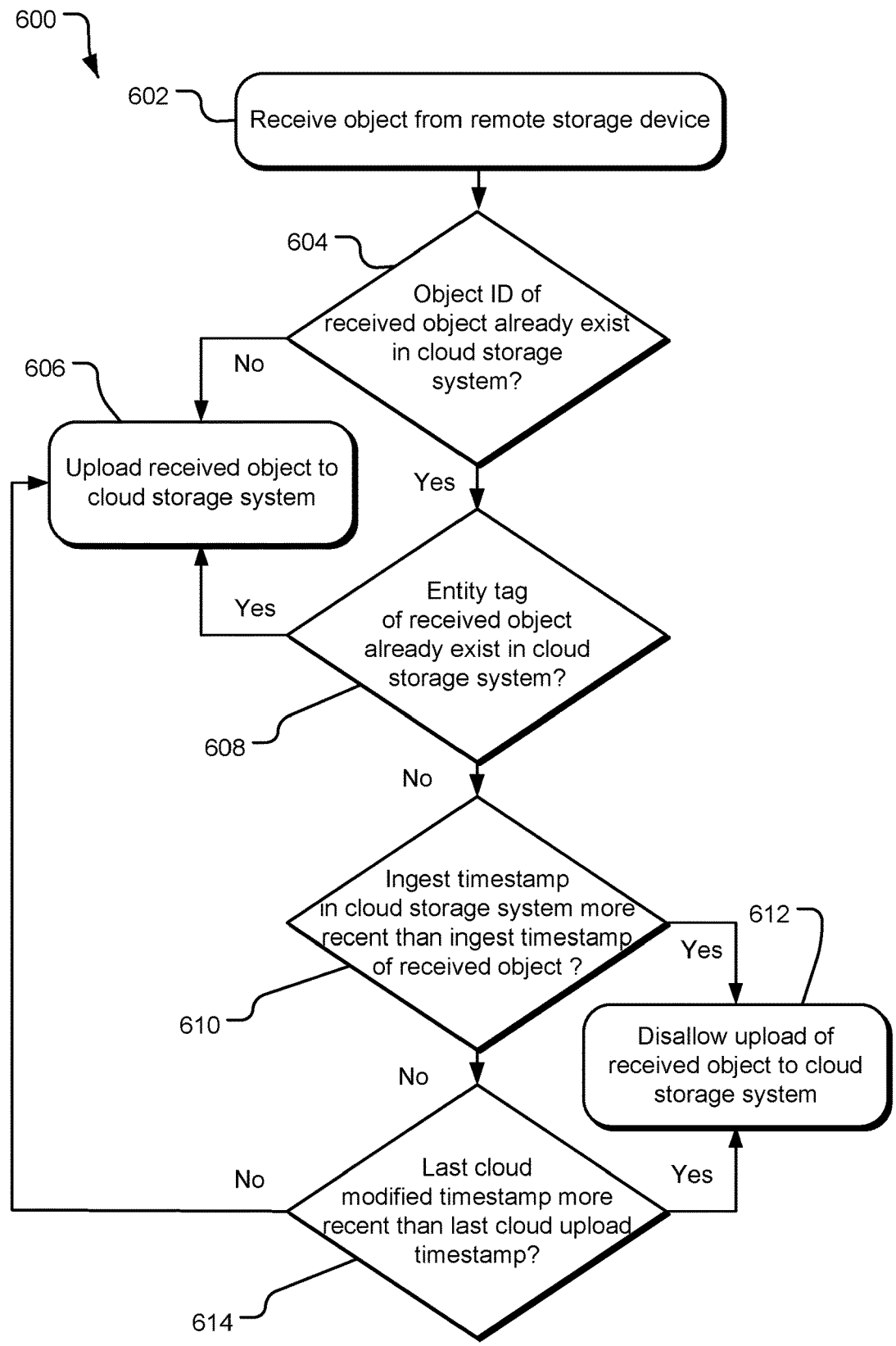
FIG. 6 illustrates an example method of managing uploads of objects to a cloud storage system.

FIG. 6 illustrates an example method 600 of determining a conflict status of objects and managing uploads of the objects to a cloud storage system. Upon an operation 602 of receiving an object from a remote storage device (e.g., from a data box pod or edge, etc.), the method 600 includes a query 604 asking whether an object ID of the received object already exists in the cloud storage system. In response to a negative answer to the query 604, the method 600 proceeds to an upload operation 606 whereby the received object is uploaded to the cloud storage system. Otherwise, the method 600 proceeds to another query operation 608 asking whether an entity tag (e.g., etag) of the received object already exists in the cloud storage system. In response to an affirmative answer to the query operation 608, the method 600 proceeds to the upload operation 606. Otherwise, the method proceeds to a further query 610 asking whether an ingest timestamp (e.g., dbit) associated with the existing object id in the cloud storage system is more recent than an ingest timestamp in the received object. In response to an affirmative answer to the query 608, the method 600 concludes that a conflict status for the potential upload is that there is a conflict (i.e., between the received object and an existing object in the cloud storage system) and then proceeds to an upload disallowing operation 612 that disallows upload of the received object into the cloud storage system. Otherwise, the method 600 proceeds to a still yet further query 614 asking whether a last cloud modified timestamp (e.g., mt) associated with the existing object id in the cloud storage system is more recent than a last cloud upload timestamp (e.g., dbut) associated with the existing object id in the cloud storage system. The method 600 concludes that a conflict status for the potential upload is that there is a conflict and then proceeds to the upload disallowing operation 612 in response to an affirmative answer to the query 610 and concludes that a conflict status for the potential upload is that there is no conflict and then proceeds to the upload operation 606 in response to a negative answer to the query 610.

Figure 7:
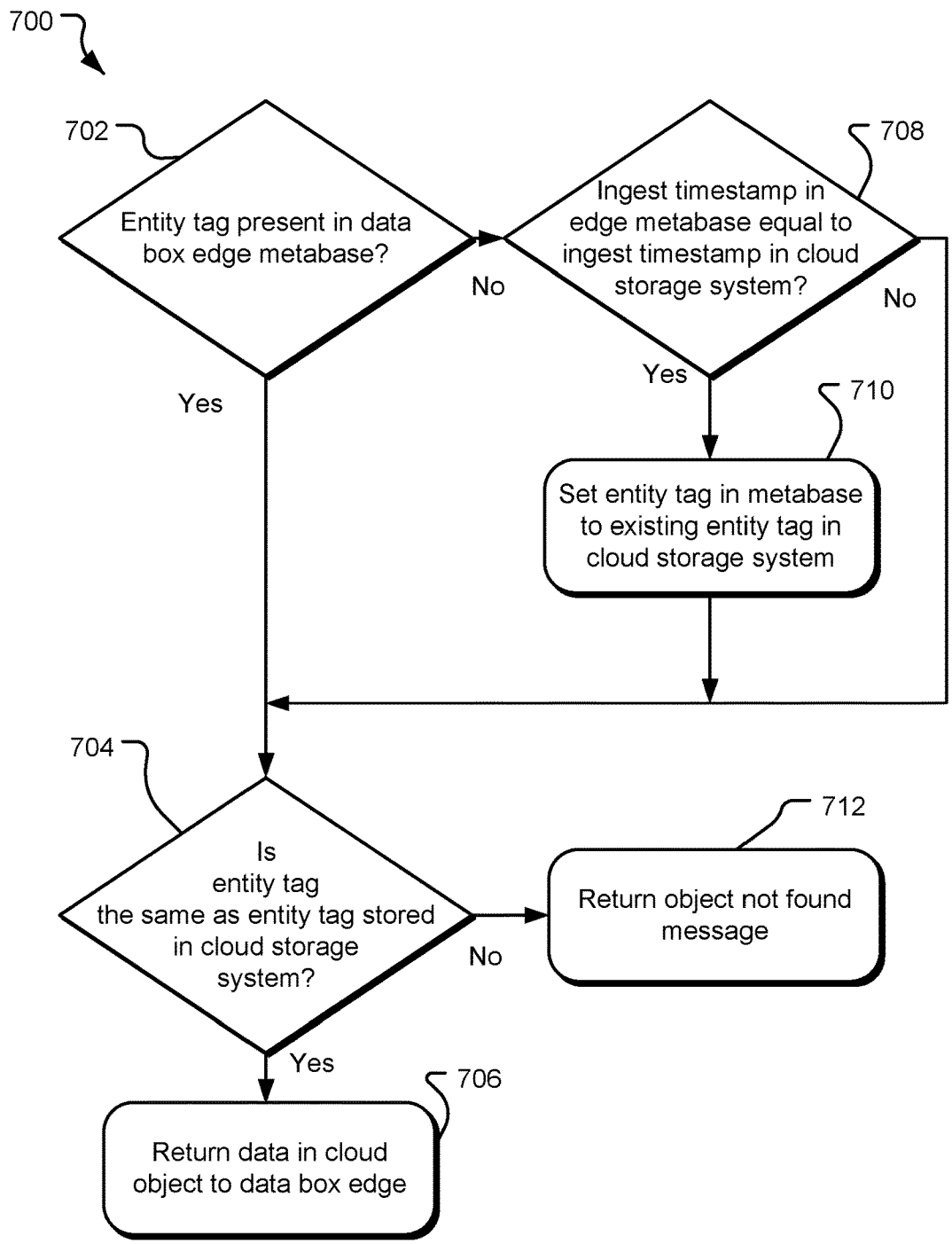
FIG. 7 illustrates an example method of managing requests to read objects in a cloud storage system.

FIG. 7 illustrates example operations 700 for managing requests to read objects in a cloud storage system. A query operation 702 asks whether an entity tag is already present in a data box edge metabase (e.g., metabase 232 of FIG. 2). If so, another query operation 704 asks whether the entity tag in the metabase is the same as an entity tag already present in the cloud storage system. If so, then a data returning operation 706 includes returning data in the cloud storage system associated with the entity tag to the data box edge or other requested location. If the answer to the query operation 704 is negative, then a message returning operation 712 returns an "object not found" message or the like (e.g., a "wait" message). If the answer to the query operation 702 is negative, then another query operation 708 asks whether an ingest timestamp in the metabase is equal to the ingest timestamp in the cloud storage system (e.g., both of which are associated with the same object identifier). A positive answer to the query operation 708 includes a setting operation 710 that sets the entity tag in the metabase to be the same as that in the cloud storage system. A negative answer to the query operation 708 and/or completion of the setting operation 710 directs processing to the query operation 704 to evaluate whether the etags have changed.

Figure 8:
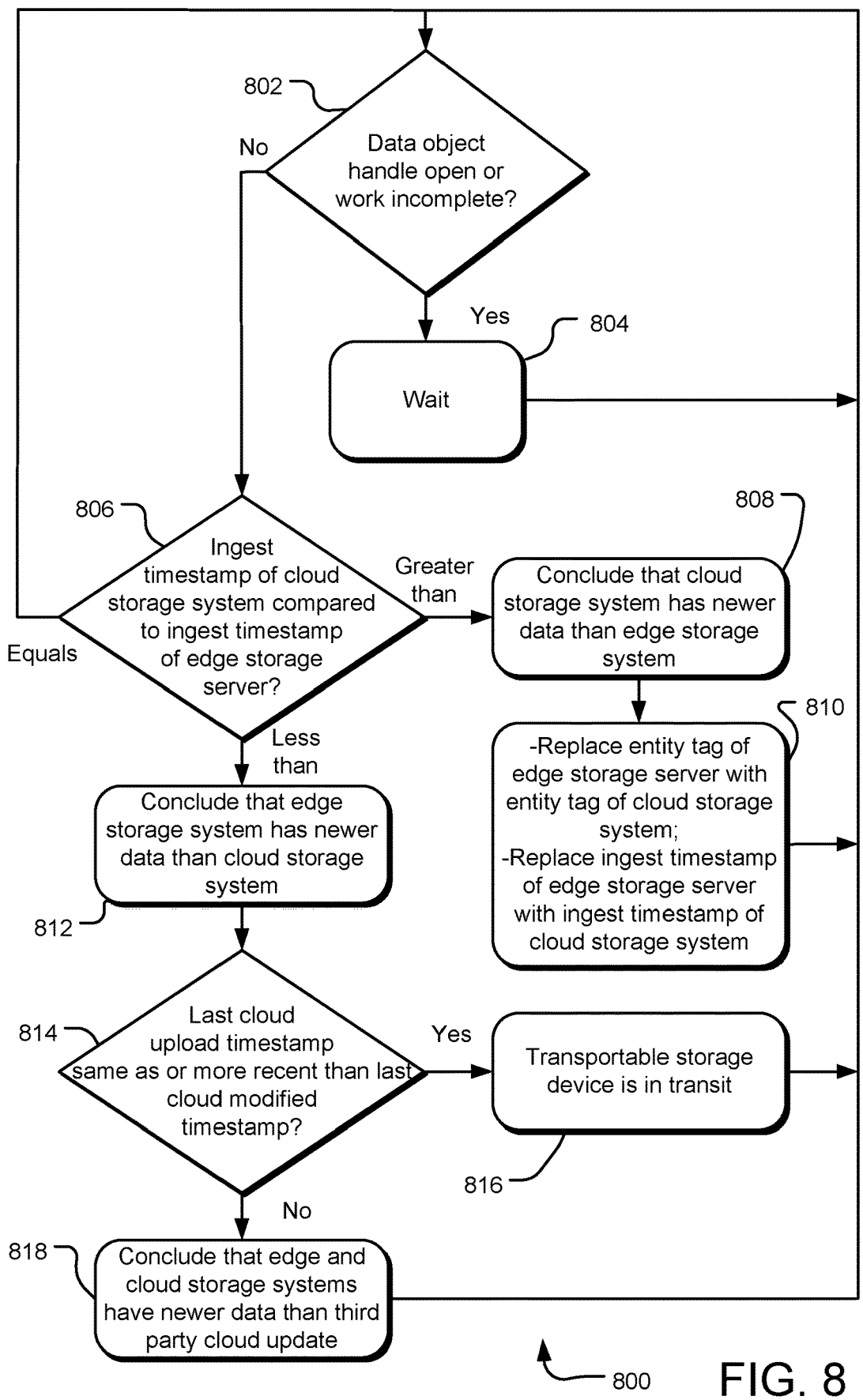
FIG. 8 illustrates an example method of refreshing objects from a cloud storage system to an edge storage system.

FIG. 8 illustrates example operations 800 of refreshing objects from a cloud storage system to an edge storage system. A query operation 802 initially asks whether a data object handle is open or work on that data object is incomplete. If so, a waiting operation 804 includes waiting before returning to the query 802. Otherwise, a query operation 806 compares an ingest timestamp of an existing object in the cloud storage system to an ingest timestamp of a corresponding object in the edge storage server (e.g., as stored in metabase 232 of FIG. 2), both of the ingest timestamps being linked to the same object identifier. If the ingest timestamp from the cloud storage system is equal to the ingest timestamp from the edge storage server, then processing returns to the query operation 802.

If the ingest timestamp from the cloud storage system is greater than the ingest timestamp from the edge storage server, then a concluding operation 808 concludes that the cloud storage system has newer data than the edge storage system (e.g., the data 218 in cloud data object 224 is newer than data 218 in data box edge 208, the object identifiers 220 in the cloud data object 224 and data box edge 208 being the same). Thereafter, a replacing operation 810 replaces the entity tag of the edge storage server (e.g., the entity tag in the metabase 232) with the entity tag of the cloud storage system and the ingest timestamp of the edge storage server with the ingest timestamp of the cloud storage system. Processing then returns to the query operation 802.

If the ingest timestamp from the cloud storage system is greater than the ingest timestamp from the edge storage server, then another concluding operation 812 concludes that the edge storage system has newer data than the cloud storage system. Thereafter, a query operation 814 queries whether the last cloud upload timestamp (e.g., dbut) is the same as or more recent than the last cloud modified timestamp (e.g., mt). If so, a concluding operation 816 concludes that a transportable device (e.g., data box pod) is in transit; otherwise, a concluding operation 818 concludes that the edge and cloud storage systems both have newer data than a third-party cloud update. If an object is in the data box edge metabase but a corresponding object is not yet in the cloud storage system, a user would have to wait if a data object handle is open or work on that data object is incomplete. Otherwise, the data box edge concludes that the object is stale and thereafter deletes the data box edge object (e.g., data object 214 in FIG. 2) and the corresponding metabase object (e.g., object 234 in FIG. 2). Processing then returns to the query operation 802.

As discussed previously, existing servers that make use of transportable storage devices (e.g., for backups, etc.) remove the names of data objects on the transportable storage devices from a namespace of the servers upon communicative decoupling of the transportable storage devices from the servers for eventual upload to a cloud storage system (e.g., assuming the servers also no longer maintain a copy of the corresponding data objects). However, this situation can sometimes result in temporary "loss" of the data objects (e.g., client devices cannot see the data objects) during the time after communicative decoupling of a transportable storage device from a server and before upload of the data objects on the transportable storage device to a cloud storage system.

Figure 9:
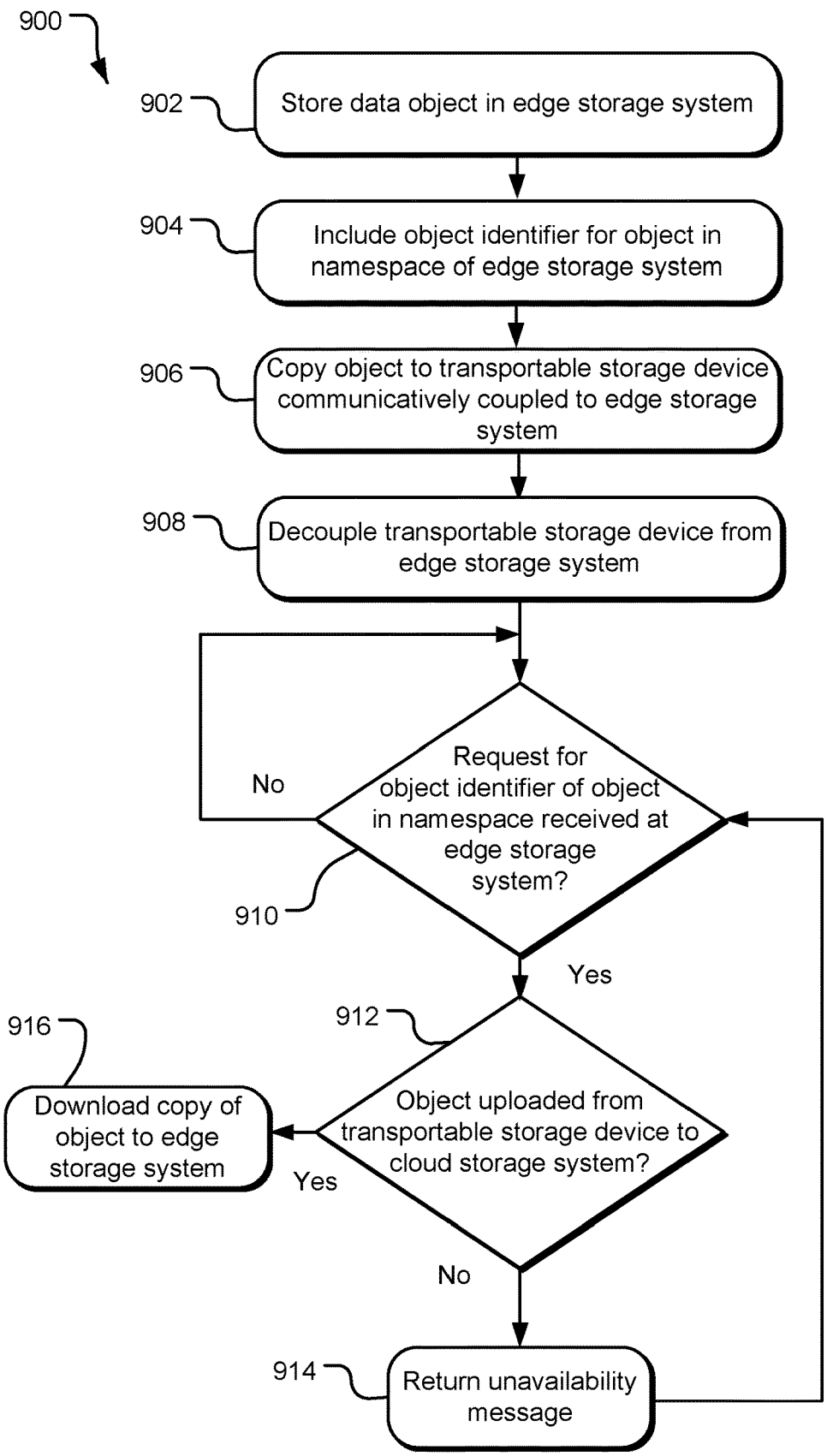
FIG. 9 illustrates an example method of maintaining an object identifier of an object in a namespace of an edge storage system after decoupling of a transportable storage device on which the object is stored from the edge storage system.

In this regard, FIG. 9 illustrates an example method 900 of maintaining object identifier of corresponding objects in a namespace of an edge storage system after decoupling of a transportable storage device on which the objects are stored from the edge storage system so that client device users can continue to "see" the object identifiers (e.g., data object names, etc.) linked with the objects while the transportable storage device is in transport. A storing operation 902 initially includes storing a data object in an edge storage system (e.g., ingesting data object 214 from client device 204 into data box edge 208 in FIG. 2) and an object identifier inclusion operation 904 includes including an object identifier (e.g., a data object name) for the object in a namespace of the edge storage system (e.g., in namespace 350 of a data box edge 308 of FIG. 3). As discussed herein, the various data box edges of an edge storage system of a customer data center may be configured to share all their respective namespaces and resolve duplicates in substantially real-time such that each data box edge has a substantially identical namespace.

A copying operation 906 includes copying the object to a transportable storage device (e.g., data box pod 210 of FIG. 2) that is communicatively coupled to the edge storage system and then a decoupling operation 908 includes communicatively decoupling the transportable storage device from the edge storage system. For example, the transportable storage device may be decoupled from the edge storage system and then physically transported to a cloud data center or the like for upload to a cloud storage system. In some implementations, data storage associated with the data object may be removed (e.g., deleted) from the edge storage system (e.g., before the decoupling operation 908). As discussed herein, situations exist in which particular data is only available on a single data box pod 310 (e.g., the data has been removed from its corresponding data box edge 308) which is subsequently communicatively decoupled from its data box edge 308 and has not yet reached the cloud data center for upload to the cloud storage system. In this case, the UID 352 for the data on the data box pod remains in the namespace 350 of the data box edge 308 so that client devices can see that the corresponding data exists (in contrast to other systems where data on a transportable device in transit is essentially invisible to client devices until the transportable device has been uploaded to a cloud storage system). However, manipulation of the UID 352 in the namespace 350 before uploading of the data to the cloud storage system induces the data box edge 308 to return a "data temporarily unavailable" message or the like to the user. In this regard, the UID 352 serves as a data "stub" while the data box pod 310 is in transit. Once the data has been uploaded to the cloud storage system, manipulation of the corresponding UID 352 in the namespace 350 induces the data box edge 308 to download the corresponding data from the cloud storage system and serve the data to the client device.

At this point, the data object is considered "ghosted" from the edge storage system (e.g., from the data box edge from which the transportable storage device was just communicatively decoupled) but the data object is still "stubbed" in the namespace (via its corresponding object identifier) to maintain visibility of the object identifier in the namespace. A query operation 910 then asks whether a request for an object identifier of the data object in a namespace of the edge storage system has been received. If not, the query operation 910 is performed again. Otherwise, a query operation 912 asks whether the data object corresponding to the requested object identifier has been uploaded into the cloud storage system. If not, a return message operation 914 includes returning an unavailability message to the requester (e.g., indicating that the object is temporarily unavailable). If the answer to the query operation 912 is positive, then a downloading operation 916 includes downloading a copy of the data object from the cloud storage system to the edge storage system.

In one arrangement, additional transportable storage devices may be communicatively coupled to the edge storage system, and additional data objects may be stored from the edge storage system to such additional transportable storage device(s). In this case, such additional data objects would be identified by additional object identifiers which are maintained in the namespace of the edge storage system after subsequent communicative decoupling of such additional transportable storage device(s).

In one implementation, pod identifiers (e.g., pod id 222 in FIG. 2) may be cleared from the metabase of the data box edge upon upload of the object(s) to the cloud storage system so that future attempts to read the object(s) from the particular pod/transportable storage device are not made. For example, the cloud storage system may generate and send any appropriate communication regarding the upload to the customer data center to initiate such cleaning up of the metabases of the data box edges. In one implementation, multiple copies of objects may be stored on multiple pods of a corresponding data box edge to allow reads of an object stored on a transportable storage device is transit to be serviced by another transportable storage device that is still communicatively coupled to the data box edge. Upon upload of the objects on the in-transit device to the cloud storage system, the cloud storage system can message the edge storage system regarding the same to thereby trigger cleaning of the corresponding object copies from the remaining transportable storage devices. In one implementation, the cloud data center may maintain a metabase of metadata (e.g., dbit, dbut, etag, etc.) regarding the data stored in the cloud storage system. In this regard, data box edges would update the metabase when uploading objects directly to the cloud storage system.

Data box edges can copy full files/blobs to one or more of its data box pods. In the case where a user desires to modify a file/blob on a data box edge that has already been ghosted from the data box edge to a data box pod or cloud storage system, the file/blob is first pulled down to the data box edge from the data box pod or cloud storage system, modified as necessary, and then recopied to the data box pod (and/or another of its data box pods) in its entirety. In the case where the only copy of the file/blob is on an in-transit data box edge, the pulling down would have to wait until the file/blob on the in-transit data box edge reaches the cloud storage system. It is noted that multiple data box edges may be largely disconnected from the internet for long periods of time while ingesting data from different clients (e.g., at different data centers or submarines). One or more of the data box edges may periodically copy or write objects to data box pods and/or upload objects to the cloud storage system and the technologies disclosed herein synchronize objects and identify conflicts among multiple versions of objects.

Figure 10:
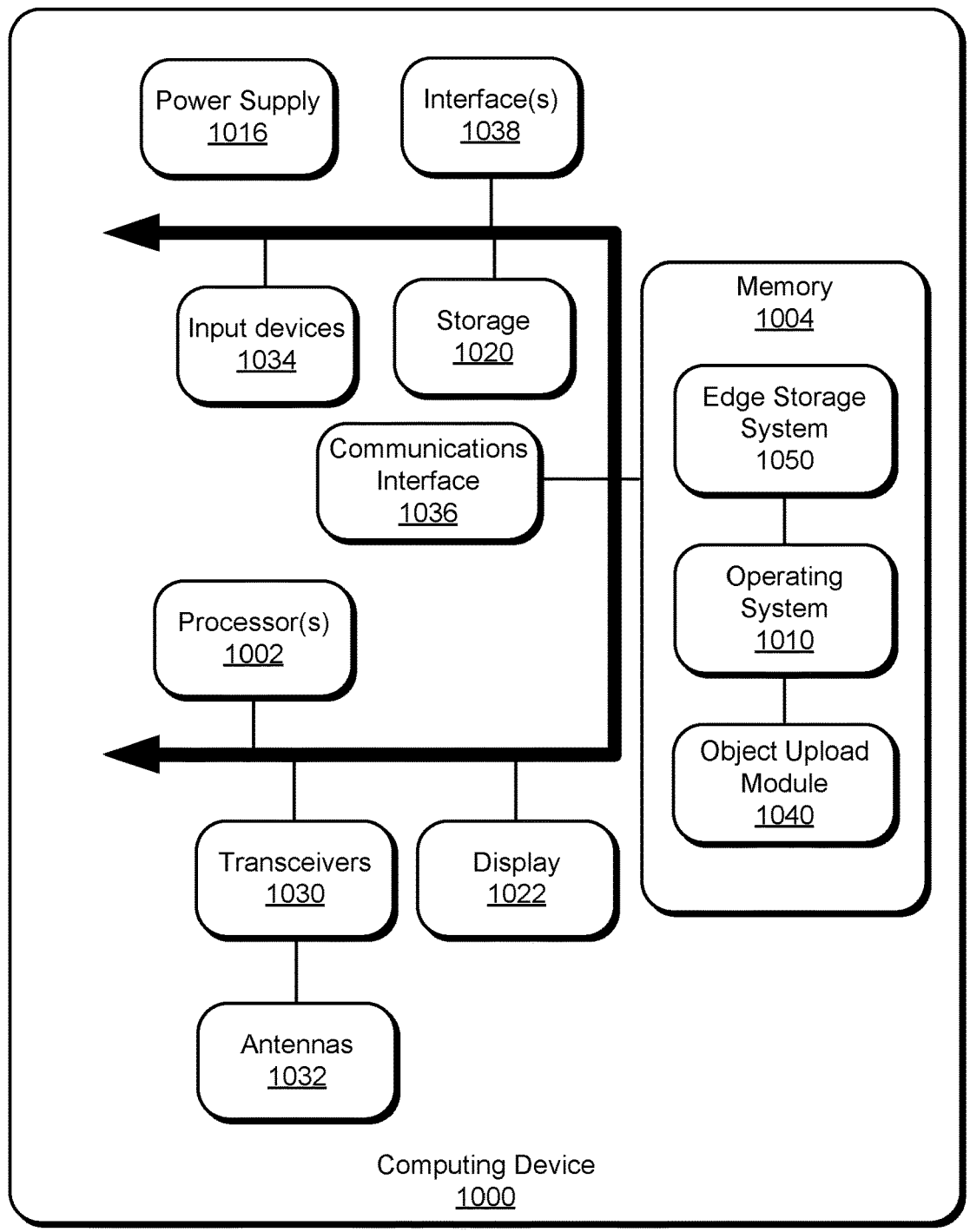
FIG. 10 illustrates an exemplary computing device for implementing the features and operations of the described technology.

FIG. 10 illustrates an example computing device 1000 for use in synchronizing online and offline transfer of data to a cloud storage system. The example computing device 1000 may be used to determine whether objects should be uploaded from an edge storage system or transportable storage device to a cloud storage system in a manner ensuring that the most recent versions of objects are the versions stored in the cloud storage system while older versions are deleted or archived, even when multiple versions of objects are in various locations in a system and arriving at the cloud storage system for potential upload and various times. The computing device 1000 may be a client device, such as a laptop, mobile device, desktop, tablet, or a server/cloud device. The computing device 1000 includes one or more processor(s) 1002, and a memory 1004. The memory 1004 generally includes both volatile memory (e.g., RAM) and non-volatile memory (e.g., flash memory). An operating system 1010 resides in the memory 1004 and is executed by the processor(s) 1002.

In an example computing device 1000, as shown in FIG. 10, one or more modules or segments, such as an object upload module 1040 (e.g., object upload modules 400, 500 of FIGS. 4-5), edge storage system 1050 (e.g., associated with data box edge 308 of FIG. 3 for use in maintaining the namespace 350), applications, application modules, and other modules, are loaded into the operating system 1010 on the memory 1004 and/or storage 1020 and installed in and executed by the object upload module 1040 and/or other processor(s) 1002. The object upload module 1040 also includes memory for storing data, metadata, objects, and/or other secured data. The storage 1020 may be local to the computing device 1000 or may be remote and communicatively connected to the computing device 1000 and may include another server. The storage 1020 may store resources that are requestable by client devices (not shown).

The computing device 1000 includes a power supply 1016, which is powered by one or more batteries or other power sources and which provides power to other components of the computing device 1000. The power supply 1016 may also be connected to an external power source that overrides or recharges the built-in batteries or other power sources.

The computing device 1000 may include one or more communication transceivers 1030 which may be connected to one or more antenna(s) 1032 to provide network connectivity (e.g., mobile phone network, Wi-Fi®, Bluetooth®) to one or more other servers and/or client devices (e.g., mobile devices, desktop computers, or laptop computers). The computing device 1000 may further include a network adapter 1036, which is a type of communication device. The computing device 1000 may use the adapter and any other types of communication devices for establishing connections over a wide-area network (WAN) or local-area network (LAN). It should be appreciated that the network connections shown are exemplary and that other communications devices and means for establishing a communications link between the computing device 1000 and other devices may be used.

The computing device 1000 may include one or more input devices 1034 such that a user may enter commands and information (e.g., a keyboard or mouse). These and other input devices may be coupled to the server by one or more interfaces 1038 such as a serial port interface, parallel port, or universal serial bus (USB). The computing device 1000 may further include a display 1022, such as a touch screen display.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes intangible communications signals (e.g., signals per se) and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 1000. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method for use with a cloud storage system is provided. The method includes receiving, at a cloud upload module from a storage device, an object that includes data and metadata. The metadata includes an object ID and an ingest timestamp corresponding to a time that the data was ingested into the storage device. The method further includes determining whether the object ID exists in an object database of objects stored in the cloud storage system and determining a conflict status regarding uploading of the received object into the cloud storage system based on the ingest timestamp of the received object, responsive to the object ID being determined to exist in the object database.

Another example method of any preceding method is provided, wherein the operation of determining a conflict status includes ascertaining that an ingest timestamp for the object ID stored in the object database is more recent than the ingest timestamp of the received object, determining that the conflict status is that a conflict exists between the received object and an existing object in the cloud storage system responsive to the ascertaining, and disallowing upload of the received object into the cloud storage system responsive to the determined conflict status.

Another example method of any preceding method is provided, wherein the ascertaining further includes ascertaining that a last cloud modified timestamp for the object ID stored in the object database is more recent than a last cloud upload timestamp for the object ID stored in the object database.

Another example method of any preceding method is provided, wherein the operation of determining a conflict status includes ascertaining that the ingest timestamp of the received object is more recent than an ingest timestamp for the object ID stored in the object database, determining that the conflict status is that a conflict does not exist between the received object and an existing object in the cloud storage system responsive to the ascertaining, and allowing upload of the received object into the cloud storage system responsive to the determined conflict status.

Another example method of any preceding method is provided, wherein the ascertaining further includes ascertaining that a last cloud upload timestamp for the object ID stored in the object database is more recent than a last cloud modified timestamp for the object ID stored in the object database.

Another example method of any preceding method is provided, wherein the allowing includes replacing, with the data in the received object, data in the cloud storage system associated with the object ID and replacing, with the metadata in the received object, metadata in the database associated with the object ID.

Another example method of any preceding method is provided, wherein the replacing the metadata includes replacing, with the ingest timestamp of the received object, the ingest timestamp for the object ID stored in the object database and replacing, with an entity tag in the received object, an entity tag for the object ID stored in the object database.

Another example method of any preceding method further includes allowing upload of at least a portion of the received object into the cloud storage system responsive to the a) object ID being determined to not exist in the object database or b) the object ID being determined to exist in the object database and an entity tag for the object ID stored in the object database matching an entity tag of the received object.

One or more example tangible processor-readable storage media embodied with instructions for executing on one or more processors and circuits of a device a process for use with a cloud storage system are provided. The process includes receiving, at a cloud upload module from a storage device, an object that includes data and metadata. The metadata includes an object ID and an ingest timestamp corresponding to a time that the data was ingested into the storage device. The process further includes determining whether the object ID exists in an object database of objects stored in the cloud storage system and determining a conflict status regarding uploading of the received object into the cloud storage system based on the ingest timestamp of the received object, responsive to the object ID being determined to exist in the object database.

One or more other example tangible processor-readable storage media of any preceding media are provided, wherein the operation of determining a conflict status includes ascertaining that an ingest timestamp for the object ID stored in the object database is more recent than the ingest timestamp of the received object, determining that the conflict status is that a conflict exists between the received object and an existing object in the cloud storage system responsive to the ascertaining, and disallowing upload of the received object into the cloud storage system responsive to the determined conflict status.

One or more other example tangible processor-readable storage media of any preceding media are provided, wherein the ascertaining further includes ascertaining that a last cloud modified timestamp for the object ID stored in the object database is more recent than a last cloud upload timestamp for the object ID stored in the object database.

One or more other example tangible processor-readable storage media of any preceding media are provided, wherein the operation of determining a conflict status includes ascertaining that the ingest timestamp of the received object is more recent than an ingest timestamp for the object ID stored in the object database, determining that the conflict status is that a conflict does not exist between the received object and an existing object in the cloud storage system responsive to the ascertaining, and allowing upload of the received object into the cloud storage system responsive to the determined conflict status.

One or more other example tangible processor-readable storage media of any preceding media are provided, wherein the ascertaining further includes ascertaining that a last cloud upload timestamp for the object ID stored in the object database is more recent than a last cloud modified timestamp for the object ID stored in the object database.

One or more other example tangible processor-readable storage media of any preceding media are provided, wherein the allowing upload of the received object into the cloud storage system after the ascertaining includes replacing, with the data in the received object, data in the cloud storage system associated with the object ID and replacing, with the metadata in the received object, metadata in the database associated with the object ID.

One or more other example tangible processor-readable storage media of any preceding media are provided, wherein the replacing the metadata includes replacing, with the ingest timestamp of the received object, the ingest timestamp for the object ID stored in the object database and replacing, with an entity tag in the received object, an entity tag for the object ID stored in the object database.

An example system includes a storage system storing a plurality of objects, each object including data and metadata, the metadata including an object ID and an ingest timestamp corresponding to a time that the data was ingested into a storage device remote from the storage system and an upload engine that manages uploads of objects into the storage system. The upload engine includes a receiver configured to receive an object that includes data and metadata. The metadata includes an object ID and an ingest timestamp corresponding to a time that the data was ingested into a storage device remote from the storage system. The system further includes a conflict manager configured to determine whether the object ID in the received object is the same as one of the object IDs in the storage system and determine a conflict status regarding uploading of the received object into the storage system based on the ingest timestamp of the received object, responsive to determining that the object ID is the same as one of the object IDs in the storage system.

Another example system of any preceding system is provided, wherein the conflict manager is configured to determine the conflict status by ascertaining that the ingest timestamp for the object ID stored in the storage system is more recent than the ingest timestamp of the received object, determining that the conflict status is that a conflict exists between the received object and one of the stored plurality of objects in the storage system responsive to the ascertaining, and disallowing upload of the received object into the storage system responsive to the determined conflict status.

Another example system of any preceding system is provided, wherein the conflict manager is configured to determine the conflict status by ascertaining that a last storage system modified timestamp for the object ID stored in the storage system is more recent than a last storage system upload timestamp for the object ID stored in the storage system.

Another example system of any preceding system is provided, wherein the conflict manager is configured to determine the conflict status by ascertaining that the ingest timestamp of the received object is more recent than the ingest timestamp for the object ID stored in the storage system, determining that the conflict status is that a conflict does not exist between the received object and an existing object in the cloud storage system responsive to the ascertaining, and allowing upload of the received object into the storage system responsive to the determined conflict status.

Another example system of any preceding system is provided, wherein the conflict manager is configured to determine the conflict status by ascertaining that a last storage system upload timestamp for the object ID stored in the storage system is more recent than a last cloud modified timestamp for the object ID stored in the storage system.

Another example system for use with a cloud storage system is provided. The system includes means for receiving, at a cloud upload module from a storage device, an object that includes data and metadata. The metadata includes an object ID and an ingest timestamp corresponding to a time that the data was ingested into the storage device. The method further includes means for determining whether the object ID exists in an object database of objects stored in the cloud storage system and means for determining a conflict status regarding uploading of the received object into the cloud storage system based on the ingest timestamp of the received object, responsive to the object ID being determined to exist in the object database.

Another example system of any preceding system is provided, wherein the means for determining a conflict status includes means for ascertaining that an ingest timestamp for the object ID stored in the object database is more recent than the ingest timestamp of the received object, means for determining that the conflict status is that a conflict exists between the received object and an existing object in the cloud storage system responsive to the ascertaining, and means for disallowing upload of the received object into the cloud storage system responsive to the determined conflict status.

Another example system of any preceding system is provided, wherein the means for ascertaining further includes means for ascertaining that a last cloud modified timestamp for the object ID stored in the object database is more recent than a last cloud upload timestamp for the object ID stored in the object database.

Another example system of any system method is provided, wherein the means for determining a conflict status includes means for ascertaining that the ingest timestamp of the received object is more recent than an ingest timestamp for the object ID stored in the object database, means for determining that the conflict status is that a conflict does not exist between the received object and an existing object in the cloud storage system responsive to the ascertaining, and means for allowing upload of the received object into the cloud storage system responsive to the determined conflict status.

Another example system of any preceding system is provided, wherein the means for ascertaining further includes means for ascertaining that a last cloud upload timestamp for the object ID stored in the object database is more recent than a last cloud modified timestamp for the object ID stored in the object database.

Another example system of any preceding system is provided, wherein the means for allowing includes means for replacing, with the data in the received object, data in the cloud storage system associated with the object ID and means for replacing, with the metadata in the received object, metadata in the database associated with the object ID.

Another example system of any preceding system is provided, wherein the means for replacing the metadata includes means for replacing, with the ingest timestamp of the received object, the ingest timestamp for the object ID stored in the object database and replacing, with an entity tag in the received object, an entity tag for the object ID stored in the object database.

Another example system of any preceding system further includes means for allowing upload of at least a portion of the received object into the cloud storage system responsive to the a) object ID being determined to not exist in the object database or b) the object ID being determined to exist in the object database and an entity tag for the object ID stored in the object database matching an entity tag of the received object.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for use with a cloud storage system, the method comprising:
receiving, at a cloud upload module from a storage device, an object that includes data and metadata, the metadata including an object ID and an ingest timestamp corresponding to a time that the data was ingested into the storage device;
determining whether the object ID exists in an object database of objects stored in the cloud storage system; and
determining a conflict status regarding uploading of the received object into the cloud storage system based on the ingest timestamp of the received object, responsive to the object ID being determined to exist in the object database.

2. The method of claim 1, wherein the operation of determining a conflict status includes:
ascertaining that an ingest timestamp for the object ID stored in the object database is more recent than the ingest timestamp of the received object;
determining that the conflict status is that a conflict exists between the received object and an existing object in the cloud storage system responsive to the ascertaining; and
disallowing upload of the received object into the cloud storage system responsive to the determined conflict status.

3. The method of claim 2, wherein the ascertaining further includes:
ascertaining that a last cloud modified timestamp for the object ID stored in the object database is more recent than a last cloud upload timestamp for the object ID stored in the object database.

4. The method of claim 1, wherein the operation of determining a conflict status includes:
ascertaining that the ingest timestamp of the received object is more recent than an ingest timestamp for the object ID stored in the object database;
determining that the conflict status is that a conflict does not exist between the received object and an existing object in the cloud storage system responsive to the ascertaining; and
allowing upload of the received object into the cloud storage system responsive to the determined conflict status.

5. The method of claim 4, wherein the ascertaining further includes:
ascertaining that a last cloud upload timestamp for the object ID stored in the object database is more recent than a last cloud modified timestamp for the object ID stored in the object database.

6. The method of claim 4, wherein the allowing includes:
replacing, with the data in the received object, data in the cloud storage system associated with the object ID; and
replacing, with the metadata in the received object, metadata in the object database associated with the object ID.

7. The method of claim 6, wherein the replacing the metadata includes:
replacing, with the ingest timestamp of the received object, the ingest timestamp for the object ID stored in the object database; and
replacing, with an entity tag in the received object, an entity tag for the object ID stored in the object database.

8. The method of claim 1, further including:
allowing upload of at least a portion of the received object into the cloud storage system responsive to the a) object ID being determined to not exist in the object database orb) the object ID being determined to exist in the object database and an entity tag for the object ID stored in the object database matching an entity tag of the received object.

9. The method of claim 1, wherein the ingest timestamp corresponds to a time that the data was ingested into the storage device remote from the cloud storage system.

10. The method of claim 1, wherein the ingest timestamp corresponds to a time that the data was ingested into the storage device prior to the receiving operation.

11. One or more tangible processor-readable storage media embodied with instructions for executing on one or more processors and circuits of a device a process for use with a cloud storage system, the process comprising:
   receiving, at a cloud upload module from a storage device, an object that includes data and metadata, the metadata including an object ID and an ingest timestamp corresponding to a time that the data was ingested into the storage device;
   determining whether the object ID exists in an object database of objects stored in the cloud storage system; and
   determining a conflict status regarding uploading of the received object into the cloud storage system based on the ingest timestamp of the received object, responsive to the object ID being determined to exist in the object database.

12. The one or more tangible processor-readable storage media of claim 11, wherein the operation of determining a conflict status includes:
   ascertaining that an ingest timestamp for the object ID stored in the object database is more recent than the ingest timestamp of the received object;
   determining that the conflict status is that a conflict exists between the received object and an existing object in the cloud storage system responsive to the ascertaining; and
   disallowing upload of the received object into the cloud storage system responsive to the determined conflict status.

13. The one or more tangible processor-readable storage media of claim 12, wherein the ascertaining further includes:
   ascertaining that a last cloud modified timestamp for the object ID stored in the object database is more recent than a last cloud upload timestamp for the object ID stored in the object database.

14. The one or more tangible processor-readable storage media of claim 11, wherein the determining a conflict status includes:
   ascertaining that the ingest timestamp of the received object is more recent than an ingest timestamp for the object ID stored in the object database;
   determining that the conflict status is that a conflict does not exist between the received object and an existing object in the cloud storage system responsive to the ascertaining; and
   allowing upload of the received object into the cloud storage system responsive to the determined conflict status.

15. The one or more tangible processor-readable storage media of claim 14, wherein the ascertaining further includes:
   ascertaining that a last cloud upload timestamp for the object ID stored in the object database is more recent than a last cloud modified timestamp for the object ID stored in the object database.

16. The one or more tangible processor-readable storage media of claim 14, wherein the allowing upload of the received object into the cloud storage system after the ascertaining includes:
   replacing, with the data in the received object, data in the cloud storage system associated with the object ID; and
   replacing, with the metadata in the received object, metadata in the object database associated with the object ID.

17. The one or more tangible processor-readable storage media of claim 16, wherein the replacing the metadata includes:
   replacing, with the ingest timestamp of the received object, the ingest timestamp for the object ID stored in the object database; and
   replacing, with an entity tag in the received object, an entity tag for the object ID stored in the object database.

18. A system including a processor and memory, the processor configured to execute instructions stored in the memory, comprising:
   a storage system storing a plurality of objects, each object including data and metadata, the metadata including an object ID and an ingest timestamp corresponding to a time that the data was ingested into a storage device remote from the storage system; and
   an upload engine that manages uploads of objects into the storage system, wherein the upload engine includes:
      a receiver executable by the processor and configured to receive an object that includes data and metadata, the metadata including an object ID and an ingest timestamp corresponding to a time that the data was ingested into a storage device remote from the storage system; and
      a conflict manager executable by the processor and configured to determine whether the object ID in the received object is the same as one of the object IDs in the storage system and determine a conflict status regarding uploading of the received object into the storage system based on the ingest timestamp of the received object, responsive to determining that the object ID is the same as one of the object IDs in the storage system.

19. The system of claim 18, wherein the conflict manager is configured to determine the conflict status by ascertaining that the ingest timestamp for the object ID stored in the storage system is more recent than the ingest timestamp of the received object, determining that the conflict status is that a conflict exists between the received object and one of the stored plurality of objects in the storage system responsive to the ascertaining, and disallowing upload of the received object into the storage system responsive to the determined conflict status.

20. The system of claim 19, wherein the conflict manager is configured to determine the conflict status by ascertaining that a last storage system modified timestamp for the object ID stored in the storage system is more recent than a last storage system upload timestamp for the object ID stored in the storage system.

21. The system of claim 18, wherein the conflict manager is configured to determine the conflict status by ascertaining that the ingest timestamp of the received object is more recent than the ingest timestamp for the object ID stored in the storage system, determining that the conflict status is that a conflict does not exist between the received object and an existing object in the storage system responsive to the ascertaining, and allowing upload of the received object into the storage system responsive to the determined conflict status.

22. The system of claim 21, wherein the conflict manager is configured to determine the conflict status by ascertaining that a last storage system upload timestamp for the object ID stored in the storage system is more recent than a last cloud modified timestamp for the object ID stored in the storage system.

\* \* \* \* \*